(No Model.)
F. LAMBERT.
METHOD OF MANUFACTURING ARTICLES OF COMBINED HARD RUBBER AND METAL.
No. 452,479.  Patented May 19, 1891.
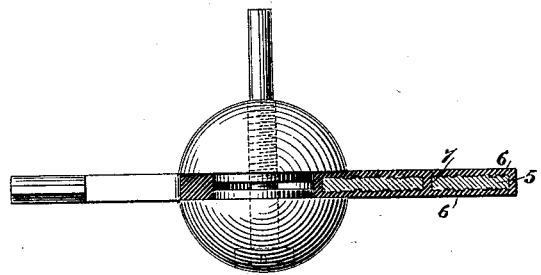
Witnesses
Geo. W. Breek.
Edward Thorpe.
Inventor:
Frank Lambert

UNITED STATES PATENT OFFICE.

FRANK LAMBERT, OF BROOKLYN, ASSIGNOR TO THE THOMSON METER COMPANY, OF NEW YORK, N. Y.

METHOD OF MANUFACTURING ARTICLES OF COMBINED HARD RUBBER AND METAL.

SPECIFICATION forming part of Letters Patent No. 452,479, dated May 19, 1891.

Application filed January 3, 1891. Serial No. 376,648. (No model.)

*To all whom it may concern:*

Be it known that I, FRANK LAMBERT, a citizen of the Republic of France, residing at Brooklyn, Kings county, New York, have invented certain new and useful Improvements in the Method of Manufacturing Articles of Combined Hard Rubber and Metal, of which the following is a specification.

This invention refers to a method or process of treating hard rubber when united to metal plates for use in oscillating-disk actions.

The object of the invention is to decrease the sensibility of hard rubber to the distorting action of hot water.

In the manufacture of articles consisting of rubber and metal which are to be subjected in use to the action of heated fluids, and especially of hot water, it is common to melt or otherwise shape the article to the desired form, and to then finish it to the exact shape required if in the molding such shape has not been imparted with precision. While by this means the initial shape of the article has been properly secured, it has been found in practice that the effect of the heated fluid is to distort the article, and to thereby vary its shape or dimensions or proportions to such an extent as to greatly impair its value, especially when used for instruments or apparatus of precision. I have discovered that the difficulties incident to this method of construction may be obviated by again subjecting the article, after having been preliminarily formed and vulcanized, to the action of heat, preferably to the action of the heated fluid in which it is to finally operate, and thereafter withdrawing and chilling or cooling the same, and then finishing or machining it in the ordinary manner. Articles thus made from hard rubber and metal may in use be operated in baths of hot fluid without losing their shape or proportions, as heretofore, so that such articles may effectively be employed in instruments or apparatus requiring considerable nicety of operation.

For the purpose of fully illustrating my invention, I shall describe the same in connection with the manufacture of the oscillating disk used in such apparatus as are set forth, for instance, in Letters Patent No. 375,023.

In the accompanying drawing I have shown such an oscillating disk with my invention applied thereto.

In the drawing, 6 represents hard rubber, within which is a metal plate 5. The plate is provided with indentations on its surface, and is also perforated, as 7. In its original manufacture the rubber is laid in sheets upon the plate and then vulcanized, the plastic compound flowing into the cavities through the perforations and over the edges of the plate, completely enveloping and imprisoning it within the rubber, which is then, as one mass, removed from the die and cooled.

The foregoing briefly describes the steps and conditions prior and necessary to my additional treatment, which consists in heating the disk, preferably by immersing it in boiling water or oil, until it will have attained the temperature of the bath, when it is withdrawn and chilled in cool water. The effect of this process is to produce inequalities upon the surface of the rubber—indentations and elevations analogous to the "shrinkages" which appear in cast metal. The rubber surface of the disk may then be machined in the ordinary way, and if the disk thereafter be inserted in a hot bath the distortion, if any, is but slight, but very much less than before the first immersion, and will usually not interfere with the proper action or use of the mechanism.

It will be evident that where extreme nicety of operation is required the article may be immersed and finished several times until it attains its ultimate permanent condition.

The advantage due to this process is to practically eliminate the failure of hard-rubber-disk actions, due to the "back-setting" of hot water in house, pump, and water-meter service.

Without limiting myself to the use of any particular fluid, I claim as my invention—

The method, substantially as hereinbefore set forth, of manufacturing articles of hard rubber and metal, the same consisting in vulcanizing the rubber portion, then subjecting the article to the action of heat, then cooling the same, and finishing the rubber portion.

In testimony whereof I have signed my name to this specification in the presence of two subscribing witnesses.

FRANK LAMBERT.

Witnesses:
JOHN THOMSON,
EDWD. K. ANDERTON.